US009889915B2

(12) United States Patent
Zhang et al.

(10) Patent No.: US 9,889,915 B2
(45) Date of Patent: Feb. 13, 2018

(54) SYSTEMS, APPARATUSES, AND METHODS TO CONTROL OUTPUT POWER OF GROUPS OF ENGINES

(71) Applicant: Caterpillar Inc., Peoria, IL (US)

(72) Inventors: Yanchai Zhang, Dunlap, IL (US); Michael A. Snopko, Washington, IL (US); Insu Chang, Peoria, VA (US); Vijay Janardhan, Dunlap, IL (US); Perry D. Converse, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/198,604

(22) Filed: Jun. 30, 2016

(65) Prior Publication Data

US 2018/0001985 A1 Jan. 4, 2018

(51) Int. Cl.

| | |
|---|---|
| ***G06F 19/00*** | (2011.01) |
| ***G06G 7/70*** | (2006.01) |
| ***B63H 21/21*** | (2006.01) |
| ***F02D 25/00*** | (2006.01) |
| ***F02D 29/02*** | (2006.01) |
| ***F02D 41/26*** | (2006.01) |

(52) U.S. Cl.
CPC ............. *B63H 21/21* (2013.01); *F02D 25/00* (2013.01); *F02D 29/02* (2013.01); *F02D 41/26* (2013.01); *B63H 2021/216* (2013.01)

(58) Field of Classification Search
None
See application file for complete search history.

(56) References Cited

U.S. PATENT DOCUMENTS

| | | | | |
|---|---|---|---|---|
| 5,012,420 A * | 4/1991 | Walker | F01D 11/24 | 415/1 |
| 6,066,897 A * | 5/2000 | Nakamura | F02D 25/00 | 290/4 A |
| 6,534,958 B1 * | 3/2003 | Graber | F02B 63/04 | 123/2 |
| 8,205,594 B2 * | 6/2012 | Fore | F02D 29/06 | 123/339.18 |
| 8,606,424 B2 * | 12/2013 | Abido | H02J 3/38 | 700/28 |

(Continued)

OTHER PUBLICATIONS

Balci, Huseyin Hakan et al. "Scheduling Electric Power Generators Using Particle Swarm Optimization Combined with the Lagrangian Relaxation Method," Int. J. Appl. Math. Comput. Sci., 2004, vol. 14., No. 3, 411-421.

*Primary Examiner* — Nicholas Kiswanto
*Assistant Examiner* — Kenny A Taveras

(57) ABSTRACT

A control system to optimize response time of a plurality of engines of a machine is provided. The control system includes a controller configured to determine a first engine group and a second engine group based on data regarding response time characteristics of the plurality of engines, control the first engine group to increase output power of the machine when the output power of the machine is below a predetermined power output threshold, and control the second engine group to increase output power of the machine responsive to the output power of the machine reaching the predetermined power output threshold. A response time of the first engine group is faster than a response time of the second engine group when the output power of the machine is below the predetermined power output threshold.

10 Claims, 6 Drawing Sheets

(56) References Cited

U.S. PATENT DOCUMENTS

| | | | | |
|---|---|---|---|---|
| 9,683,503 | B2 * | 6/2017 | Zhang | F02D 41/0205 |
| 2003/0221668 | A1 * | 12/2003 | Hashimoto | F02D 11/105 123/396 |
| 2006/0090466 | A1 * | 5/2006 | Kowatari | B60K 6/24 60/608 |
| 2009/0118940 | A1 * | 5/2009 | Heap | B60K 6/26 701/54 |
| 2009/0118963 | A1 * | 5/2009 | Heap | B60K 6/26 701/99 |
| 2010/0144219 | A1 * | 6/2010 | Balogh | B63H 21/20 440/3 |
| 2010/0274420 | A1 * | 10/2010 | Veit | B63H 3/10 701/21 |
| 2011/0106321 | A1 * | 5/2011 | Cherian | H02J 3/00 700/286 |
| 2011/0175533 | A1 * | 7/2011 | Holman | E04B 9/32 315/130 |
| 2011/0213540 | A1 * | 9/2011 | Tripathi | F02D 37/02 701/102 |
| 2012/0197441 | A1 * | 8/2012 | Kim | G05B 15/02 700/275 |
| 2012/0208672 | A1 * | 8/2012 | Sujan | B60W 10/02 477/5 |
| 2013/0166085 | A1 * | 6/2013 | Cherian | G05B 13/02 700/291 |
| 2014/0070756 | A1 * | 3/2014 | Kearns | H02J 7/007 320/101 |
| 2014/0200727 | A1 * | 7/2014 | Takahashi | H02J 4/00 700/295 |
| 2014/0347016 | A1 * | 11/2014 | Becker | H02J 3/32 320/136 |
| 2015/0197233 | A1 * | 7/2015 | Martin | B60W 10/06 701/22 |
| 2015/0322848 | A1 * | 11/2015 | Gokhale | B61C 5/04 60/602 |
| 2016/0036308 | A1 * | 2/2016 | Bailey | H02K 21/024 290/45 |
| 2016/0147229 | A1 * | 5/2016 | Merchant | G05D 1/0208 701/21 |
| 2016/0159357 | A1 * | 6/2016 | Pursifull | B60W 30/18109 701/51 |
| 2016/0160763 | A1 * | 6/2016 | Matsuda | F02D 9/1095 123/403 |
| 2016/0195031 | A1 * | 7/2016 | Willems | F02D 41/0087 123/52.1 |
| 2016/0251827 | A1 * | 9/2016 | Ge | B60W 30/18 701/50 |
| 2016/0347326 | A1 * | 12/2016 | Iwagami | B60W 10/06 |
| 2017/0016416 | A1 * | 1/2017 | Shafer | F02M 37/08 |
| 2017/0051692 | A1 * | 2/2017 | Zhang | G01L 3/24 |
| 2017/0122237 | A1 * | 5/2017 | Tripathi | F02D 41/0087 |
| 2017/0226973 | A1 * | 8/2017 | Blizard | F02M 43/04 |
| 2017/0229896 | A1 * | 8/2017 | Kearns | H02J 7/02 |

* cited by examiner

SYSTEMS, APPARATUSES, AND METHODS TO CONTROL OUTPUT POWER OF GROUPS OF ENGINES

TECHNICAL FIELD

The present disclosure relates to controlling output power of engines of a machine, and more particularly to an apparatus, a system, and a method to control power output distribution for different groupings of engines of the machine.

BACKGROUND

Generally, in machines, such as marine vessels and land drilling power generating machines, power resource systems that include a plurality of power resources are employed. The plurality of power resources may be engines working together to provide power for the machine.

Power distribution strategies for such multi-power resources may be based on a predefined ratio divided between the power resources. In such power distribution strategies, when operating the machine preference may be given to a power resource with relatively higher power output over a power resource with a lower power output. However, a larger power resource may take relatively more time to adapt in response to a change in required power of the machine. As a result, response time of the machine to such change in required power may be relatively slow. Therefore, haphazard utilization of power resources, particularly a plurality of engines of a multi-power resource system, may lead to undesirably long response times.

U.S. Pat. No. 8,606,424, hereinafter referred to as the '424 patent, relates to a particle swarm optimization (PSO) method for microgrids that formulates a control problem as an optimization problem, and PSO is used to search the solution space for optimal parameter settings in each mode. According to the '424 patent, the procedure models optimal design of an LC filter, controller parameters and damping resistance in grid-connected mode, and optimizes the controller parameters and power sharing coefficients in an autonomous mode. Nonlinear time-domain-based and eigenvalue-based objective functions are used to minimize the error in the measured power, and also to enhance the damping characteristics, respectively. However, the system disclosed in the '424 patent may not adequately perform power distribution control strategies between different engine groups to optimize engine output power response time in response to a change in required engine output power.

SUMMARY OF THE DISCLOSURE

In one aspect of the present disclosure, a control system to optimize response time of a plurality of engines of a machine is disclosed. The control system includes memory configured to store data regarding response time characteristics of the plurality of engines, and a controller in communication with the memory. The controller is configured to determine a first group of engines of the plurality of engines based on the data regarding response time characteristics of the plurality of engines, determine a second group of engines of the plurality of engines, different from the first group of engines, based on the data regarding response time characteristics of the plurality of engines, control the first group of engines to increase output power of the machine when the output power of the machine is below a predetermined power output threshold, and control the second group of engines to increase output power of the machine responsive to the output power of the machine reaching the predetermined power output threshold. A response time of the first group of engines is faster than a response time of the second group of engines when the output power of the machine is below the predetermined power output threshold.

In another aspect of the present disclosure, a computer-implemented method of controlling power output by engines of a multi-engine machine is disclosed. The method includes determining a first engine group of the engines based on a requested output power amount for the multi-engine machine, an engine performance characteristic of each of the engines of the multi-engine machine, and a current engine load of each of the engines of the multi-engine machine. The method also includes determining a second engine group of the engines, different from the first engine group, based on the requested output power amount for the multi-engine machine, the engine performance characteristic of each of the engines of the multi-engine machine, and the current engine load of each of the engines of the multi-engine machine. The method also includes determining a sequence of operating the first engine group and the second engine group to reach the requested output power amount for the multi-engine machine according to a determined total minimum response time from a current total output power amount of the engines. The sequence of operating the first engine group and the second engine group includes switching operation from the first engine group to the second engine group when a predetermined power output threshold is reached. The method further includes outputting at least one distributed power request to selectively drive engines of the first engine group and the second engine group according to the sequence of operating the first engine group and the second engine group. A response time of the first engine group is faster than a response time of the second engine group.

In yet another aspect of the present disclosure, a multi-engine marine vessel is disclosed. The multi-engine marine vessel includes a plurality of first engines each having a first performance rating with a first response time characteristic, and a plurality of second engines each having a second performance rating, different from the first performance rating, with a second response time characteristic different from the first response time characteristic. The multi-engine marine vessel further includes control circuitry configured to detect a transient stepped power load condition resulting from a requested amount of engine power output for the multi-engine marine vessel relative to a current power load of the multi-engine marine vessel, and switch engine control to a performance mode upon detection of the transient stepped power load condition. The control circuitry is also configured to determine which engines of the plurality of first engines are available for control by the control circuitry in the performance mode, and determine which engines of the plurality of second engines are available for control by the control circuitry in the performance mode. Additionally, the control circuitry is configured to detect current power load conditions of each of the first engines determined to be available in the performance mode, and detect current power load conditions of each of the second engines determined to be available in the performance mode. The control circuitry is also configured to determine an engine power control strategy by which to control the available first and second engines to achieve a minimum total engine response time to reach the requested amount of engine power output for the multi-engine marine vessel from the current power load of the multi-engine marine vessel, based on a determined number of available first and second engines, the current power load conditions of the available first and second engines, the first performance rating, and the second performance rating. The control circuitry is configured to output a distributed power request to selectively drive the available first and second engines according to a plurality of different engine groupings to control a total engine response time according to the minimum total response time to reach the requested amount of engine power output for the multi-engine marine vessel from the current power load of the multi-engine marine vessel, and selectively drive the available first and second engines according to the plurality of different engine groupings to control the total response time according to the minimum total response time to reach the requested amount of engine power output for the multi-engine marine vessel from the current power load of the multi-engine marine vessel. The selective driving includes switching from one engine grouping of the available first and second engines to a different engine grouping of the available first and second engines responsive to detection of a power load condition of the one engine grouping reaching a predetermined power load condition threshold.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
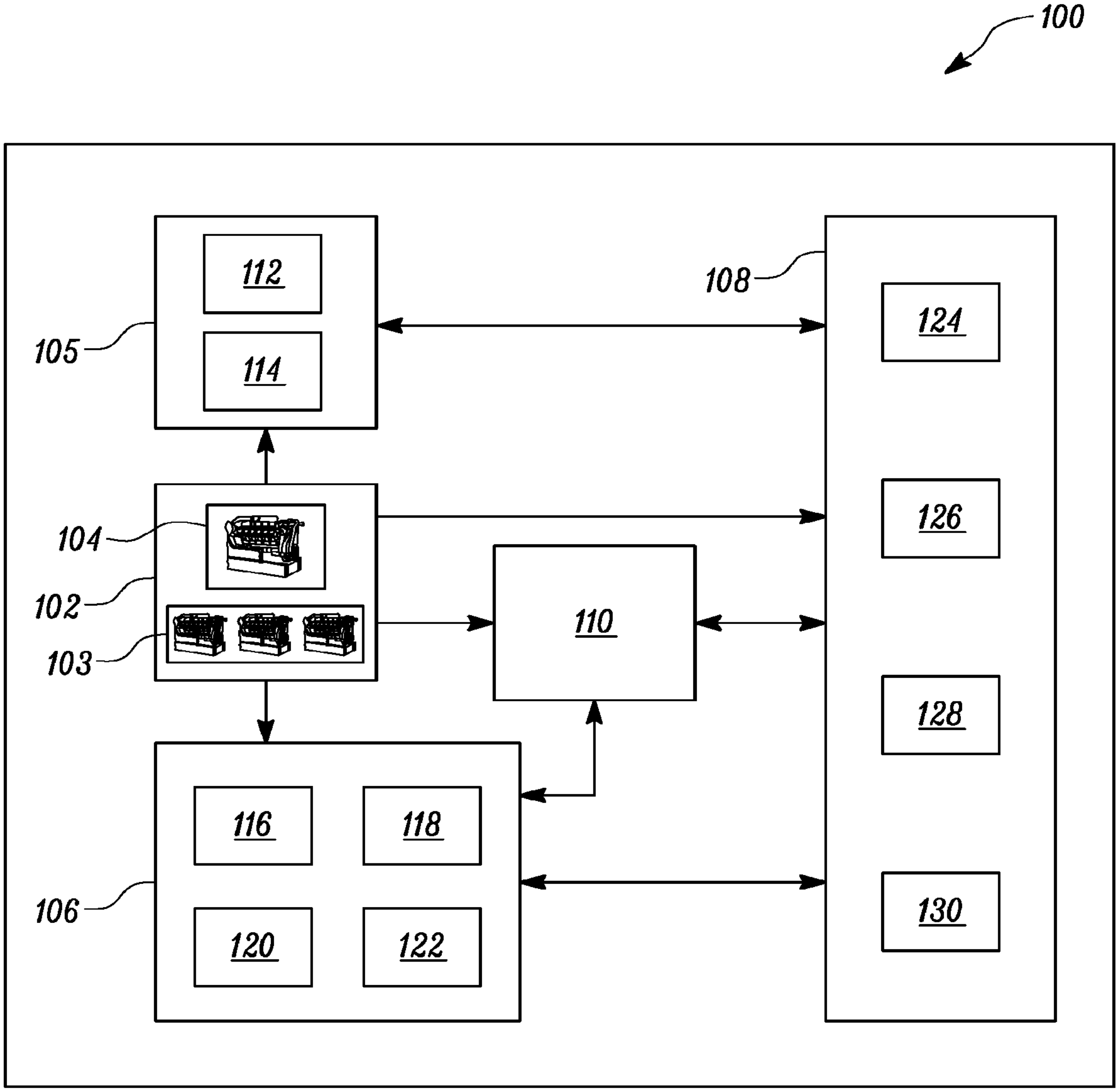
FIG. 1 is a block diagram of a machine having a plurality of engines, according to an embodiment of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, corresponding or similar reference numbers will be used throughout the drawings to refer to the same or corresponding parts.

Any reference in the specification to “one embodiment” or “an embodiment” means that a particular feature, structure, characteristic, operation, or function described in connection with an embodiment is included in at least one embodiment. Thus, any appearance of the phrases “in one embodiment” or “in an embodiment” in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms “a,” “an,” and “the” include plural references unless the context clearly dictates otherwise. That is, unless clearly specified otherwise, as used herein the words “a” and “an” and the like carry the meaning of “one or more.” Additionally, it is to be understood that terms such as “left,” “right,” “up,” “down,” “top,” “bottom,” “front,” “rear,” “side,” “height,” “length,” “width,” “upper,” “lower,” “interior,” “exterior,” “inner,” “outer,” and the like that may be used herein, merely describe points of reference and do not necessarily limit embodiments of the described subject matter to any particular orientation or configuration. Furthermore, terms such as “first,” “second,” “third,” etc. merely identify one of a number of portions, components, points of reference, operations and/or functions as described herein, and likewise do not necessarily limit embodiments of the described subject matter to any particular configuration or orientation.

Generally speaking, embodiments of the present disclosure can control power output by different groupings of engines of a machine according to a determined engine power output control strategy that focuses on engine output power response times for the different groupings of engines in relation to the types and number of engines available and a requested amount of output power for the machine. The engine power output control strategy can be implemented in response to a detected output power transient condition.

FIG. 1 is a block diagram of a multi-engine machine 100 having a plurality of engines 102, according to an embodiment of the present disclosure. The multi-engine machine 100 may be a multi-engine marine vessel, such as a ship, a boat, a barge, or a submarine. However, although embodiments of the present disclosure are explained with regard to marine vessels, the multi-engine machine 100 may be other machines, without departing from the scope of the present disclosure. For example, the multi-engine machine 100 may be a heavy work machine, such as a land drilling power generating machine. Further, in an example, the multi-engine machine 100 with the engines 102 may be subject to periodic power or load transients, which may be prevalent in marine vessels and land drilling power generating machinery.

In an embodiment, the multi-engine machine 100 may include the engines 102, a vessel management system 105, a bus management system 106, a power management system 108, and a control system 110.

As illustrated in FIG. 1, the engines 102 may be in communication with the vessel management system 105, the bus management system 106, the power management system 108, and the control system 110. The vessel management system 105 may also be in communication with the power management system 108. The power management system 108 may also be in communication with the control system 110. The control system 110 may also be in communication with the bus management system 106.

Generally speaking, the engines 102 are power sources of the multi-engine machine 100, and, therefore, may provide power to various components for operating the multi-engine machine 100, such as a drive axle or axles of the multi-engine machine 100. In an embodiment, the engines 102 may include different types of engines, for example, engines having different performance or operating characteristics. Examples of engine performance characteristics include an engine performance model, an engine output power operating or distribution range, an engine performance rating, engine output power response time, and engine power efficiency. Generally, response time can include an amount of time for power or load of an engine (or engine group as discussed later) to reach a desired or requested power output value from a current power output value. In an embodiment, the engines 102 may all be the same type of engine, for example, engines with the same performance or operating characteristics. However, the engines 102 in such embodiment may have different initial operating characteristics, which may be considered different engine performance characteristics in this context. Examples of different initial operating characteristics include different engine power outputs, different engine starting loads, and different operational modes. For example, in a case where engines of the engines 102 have the same performance characteristics, one or more of such engines may each be operating in an idle state as an initial operating characteristic, whereas one or more other such engines may each be operating in a non-idle state as an initial operating characteristic.

Some or all of the engines 102 may be grouped into different engine groups, in real-time or using data from a lookup table, based on at least one of engine type, engine performance characteristics, or current operating characteristics of each of the engines 102 or the multi-engine machine 100 as a whole, to provide output power for the multi-engine machine 100. Generally speaking, the grouping of engines 102 can result in one engine group or a plurality of engine groups, including at least a first engine group 103 and a second engine group 104. Further, each engine group may include one or more engines of the engines 102. For example, as illustrated in FIG. 1, the first engine group 103 can have a plurality of engines having the same performance characteristics, and the second engine group 104 can have a single engine having performance characteristics different from the engines of the first engine group 103. As another example, the first engine group 103 can have the plurality of engines having the same performance characteristics, and the second engine group 104 can have the single engine having performance characteristics different from the engines of the first engine group 103. As yet another example, all of the engines 102 may have the same performance characteristics, and of these engines, the first engine group 103 is made up of one or more engines each operating according to a first initial operating characteristic (e.g., an idle state), and the second engine group 104 is made up of one or more engines each operating according to a second initial operating characteristic (e.g., a non-idle state) different from the first initial operating characteristic.

In an embodiment, each of the engines of the first engine group 103 may have a first performance rating with a first response time characteristic. Further, each of the engines of the second engine group 104 may have a second response time characteristic. The second response time characteristic of the engines of the second engine group 104 may be different from the first response time characteristic of the engines of the first engine group 103. For instance, the first response time may be faster (i.e., takes less time) than the second response time or vice versa, from a current output power of the multi-engine machine 100 to reach a predetermined power output value, such as a desired or requested output power value or a predetermined power output threshold value below the desired or requested output power value.

As noted above, the multi-engine machine 100 can include the vessel management system 105, which may include a bridge control mechanism 112 and a dynamic positioning system 114.

The bridge control mechanism 112 may be operated by the operator to control various operations of the multi-engine machine 100. The bridge control mechanism 112 may include one or more of instrument panels, control levers, push-pull tabs, speakers, and screens.

Generally speaking, the dynamic positioning system 114 may inform or control positioning and routing of the multi-engine machine 100. In one example, the dynamic positioning system 114 may include sensors, such as position reference sensors, wind sensors, motion sensors, and gyrocompasses. Data detected by the sensors may be utilized for determining and controlling positioning and routing (past or future routes).

The multi-engine machine 100 can also include the bus management system 106, which may include a speed control mechanism 116, a load sharing mechanism 118, a voltage control mechanism 120, and a generator breaker control mechanism 122.

The speed control mechanism 116 may control one or more of speed and direction of the engines 102 for driving the multi-engine machine 100. In one example, the speed control mechanism 116 may include a governor (not shown) for controlling the speed of the engines 102. The load sharing mechanism 118 may provide control for load distribution between the engines 102, for instance, based on a mode of operation of the multi-engine machine 100. Further, the voltage control mechanism 120 may regulate the voltage to operate the engines 102 and other accessories of the multi-engine machine 100. The generator breaker control mechanism 122 may protect electrical circuits of one or more generators (not shown) from damage in case of overloading, fluctuating voltages, or short circuit. The generator breaker control mechanism 122 may interrupt a flow of current in the generators responsive to detection of a fault in any of the electrical circuits of the multi-engine machine 100.

The power management system 108 may control the supply of power to various components of the multi-engine machine 100. The power management system 108 may include a load side breaker control mechanism 124, a thruster control mechanism 126, a drive control mechanism 128, and a bus control mechanism 130.

The load side breaker control mechanism 124 may protect electrical circuits pertaining to load sharing between the engines 102 from damage in case of overloading, fluctuating voltages, or short circuit. The thruster control mechanism 126 may control thrust required for positioning or heading of the multi-engine machine 100. The thruster control mechanism 126 may receive data from various sensors of the multi-engine machine 100, such as a throttle input requesting an amount of speed or direction for the multi-engine machine 100, and control thrust based on such data. The drive control mechanism 128 may provide drive signals to corresponding engines 102 to drive one or more engines of the multi-engine machine 100. Further, the bus control mechanism 130 may control power supply to the bus management system 106.

The control system 110 may exchange data with the bus management system 106 and the power management system 108, and may communicate with the engines 102 to optimize response time of the engines 102. Discussed in more detail below, the control system 110 can optimize response time of power output by select groups of engines of the multi-engine machine 100. The composition and operations of the control system 110 are explained in detail below in relation to the description of FIG. 2, FIG. 3, FIG. 4, and FIG. 5.

Figure 2:
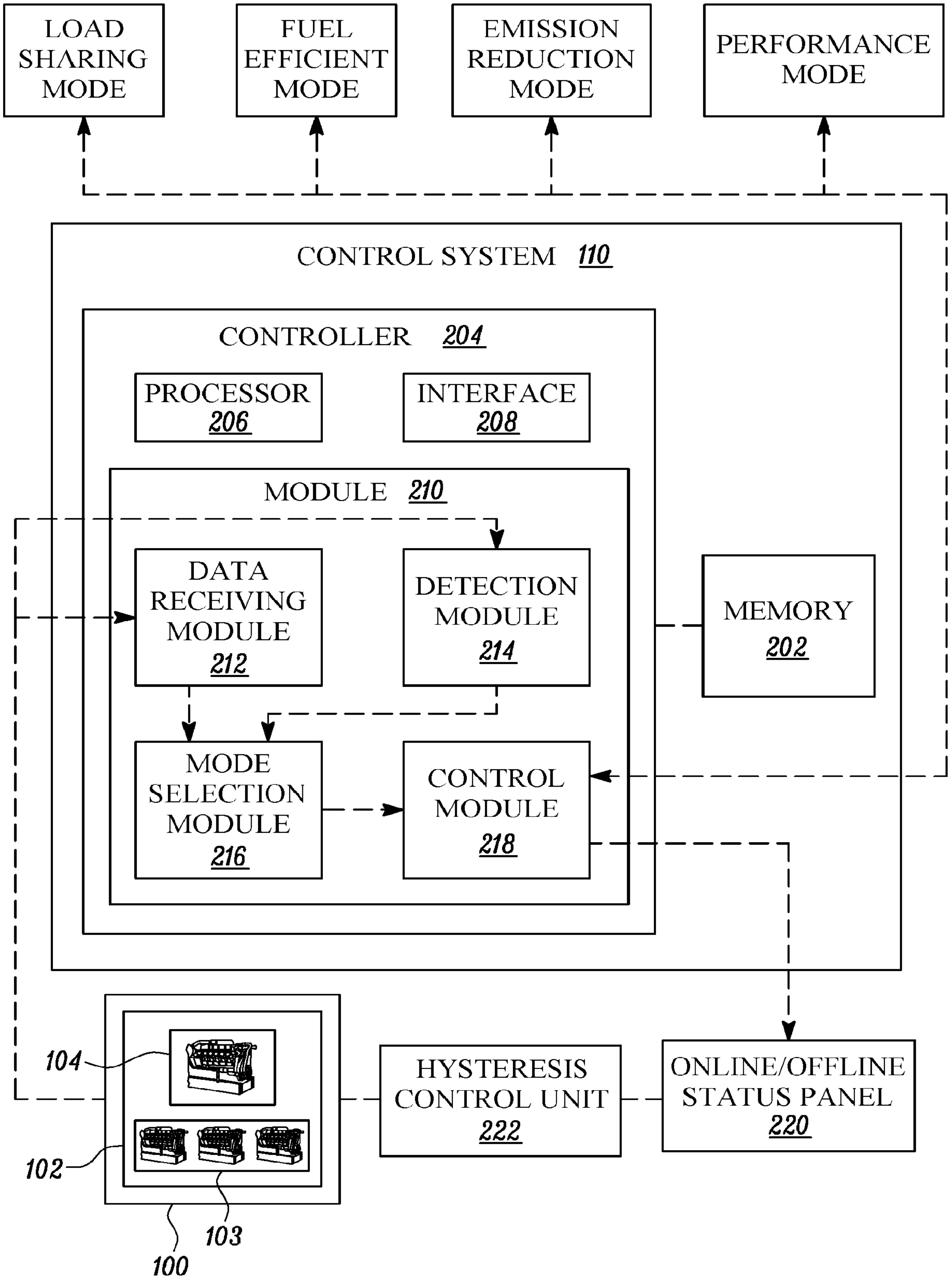
FIG. 2 is a block diagram of a control system for optimizing engine response time of the machine, according to an embodiment of the present disclosure.

FIG. 2 is a block diagram of the control system 110 for optimizing engine response time of the multi-engine machine 100, according to an embodiment of the present disclosure.

The multi-engine machine 100 may operate in various operational modes. Such operational modes may include a load sharing mode, a fuel-efficient mode, an emission reduction mode, and, notably, a performance mode to optimize engine output power response time.

In general, the load sharing mode may be understood as an operational mode in which the control system 110 defines or selects a constant ratio of different engines of the plurality of engines 102 from which to draw power, and the engines 102 operate based on the predefined constant ratio. The constant ratio may be defined based on operational specification, such as output capacity and size of each of the engines 102. The fuel-efficient mode, generally, may be understood as an operational mode in which the control system 110 controls the engines 102 to optimize fuel efficiency of the engines 102 of the multi-engine machine 100. The emission reduction mode may be understood, generally, as an operational mode in which the control system 110 controls the engines 102 to reduce or cap emission of exhaust gases from the engines 102 of the multi-engine machine 100.

As noted above, the multi-engine machine 100 can be operated in a performance mode. Generally speaking, the performance mode may be an operational mode in which the control system 110 selectively operates the engines 102 to optimize power output response time of the engines 102 for controlling the multi-engine machine 100. In this context, optimize can mean selectively driving one or more determined groups of engines, such as first engine group 103 and second engine group 104, to achieve a fastest response time to reach a predetermined power output value from a current output power of the engines 102 of the multi-engine machine 100. The predetermined power output value may be a desired or requested output power value or a predetermined power output threshold value below the desired or requested output power value.

In an embodiment, the control system 110 may operate the multi-engine machine 100 in the performance mode based on various parameters. Such parameters may be referred to as control parameters and can include at least one of a total number of the engines 102, type or types of the engines 102, a number of available engines, a current load of each of the engines 102, power values within stepped power thresholds provided to each of the engines 102, an operational mode of the multi-engine machine 100, performance characteristics of the engines 102, operational characteristics of the engines 102, a requested load for the multi-engine machine 100, a quantity of fuel available in the multi-engine machine 100, response time characteristics of each of the engines 102 for different load requirements, and response time characteristics of different groups of the engines 102 for different load requirements. Further, different engine load conditions may constitute control parameters in the form of initial operating characteristics for engines of the same type and may be used to control the engines 102 of the multi-engine machine 100 in the performance mode.

In an embodiment, the response time or times to reach a predetermined power output value from a current output power of the multi-engine machine 100 may be based on determined groups of the engines 102 to achieve a fastest response time or times per step level in output power, as compared to all other determined groups of engines, for instance. The different groups of engines may be determined based on a total number of the engines 102, the performance characteristics of the engines 102, the operational characteristics of the engines 102, a number of available engines, a current load of each of the engines 102, and the requested load of the multi-engine machine 100, for instance.

The groups of the engines 102 may be determined in real-time, according to a closed-loop feedback system, or an open-loop system using at least one of a lookup table (or tables) or an optimized distribution map (or maps) comprised of data regarding engine performance and operating characteristics in correspondence with requested or desired output power values. In the case of the closed-loop feedback system, feedback data pertaining to real-time operating characteristics of the engines 102 may be stored in a memory 202. The data pertaining to the real-time operating characteristics of the engines 102 stored in the memory 202 may be used to update the lookup table(s) or distribution map(s).

In an embodiment, the multi-engine machine 100 may be operated in one of the operational modes discussed above, such as the load sharing mode, the fuel-efficient mode, and the emission reduction mode, and the control system 110 can switch the operational mode of the multi-engine machine 100 to the performance mode. For example, the control system 110 may switch the operational mode to the performance mode responsive to detection of a transient or stepped load or power condition of the multi-engine machine 100. An example of a transient or stepped load or power condition is a change in requested total power output for the multi-engine machine 100 that exceeds at least one predetermined stepped threshold power level above a current total output power at which the multi-engine machine 100 is operating.

Turning again specifically to FIG. 2, in an embodiment, the control system 110 may include the memory 202 and a controller 204 in communication with the memory 202. Alternatively, the controller 204 may include the memory 202. In an embodiment, the memory 202 may include a non-transitory computer-readable medium. In one example, the non-transitory computer-readable medium may be or include one or more of a volatile memory, such as static random access memory, or a non-volatile memory, such as read-only memory, erasable programmable ROM, and flash memory. In another example, the memory 202 may be or include a non-volatile memory.

The controller 204, or control circuitry according to an implementation of the controller 204 in one or more embodiments of the present disclosure, can include a processor 206, an interface 208, and a module 210. The processor 206 may be configured to fetch and execute computer readable instructions stored in the memory 202, for instance. In an embodiment, the processor 206 may be implemented as one or more microprocessors, microcomputers, microcontrollers, digital signal processors, central processing units, state machine, logic circuitries or any device or devices that manipulate signals based on operational instructions.

Generally speaking, the interface 208 can facilitate communications using a variety of protocols and networks, including wired or wireless networks. Further, the interface 208 may include a variety of software and hardware interfaces. In some implementations, the interface 208 may include peripheral devices, such as a keyboard, a mouse, an external memory, and/or a printer. In one example, the interface 208 may include one or more ports for connecting the control system 110 to an output unit (not shown).

The module 210 may include hardware (circuitry or circuitry portions) and/or software (routines, programs, objects, components, and data structures) which perform particular tasks or implement particular data types. In an embodiment, the module 210 may include a data receiving module 212, a detection module 214, a mode selection module 216, and a control module 218.

In an embodiment, the data receiving module 212 can receive operating information regarding current states of the engines 102. The data receiving module 212 may also obtain one or more values of control parameters from the vessel management system 105, the bus management system 106, and the power management system 108. Therefore, the bridge control mechanism 112, the dynamic positioning system 114, the speed control mechanism 116, the load sharing mechanism 118, the voltage control mechanism 120, the generator breaker control mechanism 122, the load side breaker control mechanism 124, the thruster control mechanism 126, the drive control mechanism 128, and the bus control mechanism 130 may communicate one or more values of the control parameters to the control system 110 to control the engines 102. In an embodiment, the data receiving module 212 may obtain the one or more values from an operator of the multi-engine machine 100, for instance, a power value corresponding to a requested amount of speed for the multi-engine machine 100.

The detection module 214 of the controller 204 may detect a transient step change, i.e., a variation in load or power request conditions, of the multi-engine machine 100 that surpasses at least one predetermined stepped threshold power level different from a predetermined stepped threshold power level associated with a current total output power at which the multi-engine machine 100 is operating. In an embodiment, such transient step change may be indicative of an abrupt change which would require selective control of one or more groups of engines 102 to move to a new total output power operating point with respect to an output power operating point when the transient was detected.

Based on at least the detection of the transient step change by the detection module 214, the mode selection module 216 can cause the operation mode to switch to the performance mode for controlling operation of the engines 102 of the multi-engine machine 100. In an embodiment, transient step changes may be defined in terms of numerical values, such as power values (e.g., in kW), that are predetermined amounts away from each other. For example, transient power step values may be defined in increments of 50 kW. In an embodiment, the mode selection module 216 may use a simulation model (e.g., Simulink model) for the selection of the operational modes of the multi-engine machine 100.

In an embodiment, when the mode selection module 216 selects the operational mode of the multi-engine machine 100 to be the performance mode, the control module 218 may determine a group or groups of engines to achieve a fastest response time or times to reach a predetermined power output value from a current output power of the multi-engine machine 100, per step level in output power, for instance, as compared to all other possible groupings of the engines 102.

For example, the control module 218 may determine a first engine group 103, which may include one or more engines of the engines 102. FIG. 2, for instance, illustrates the first engine group 103 being comprised or consisting of three engines. Further, the engines of the first engine group 103 may have the same performance characteristics. Alternatively, at least one engine of the first engine group 103 may have performance characteristics different from at least one other engine of the first engine group 103. The control module 218 may determine the first engine group 103 based on the data regarding response time characteristics of the engines 102, for instance.

As mentioned earlier, the data pertaining to the response time characteristics of the engines 102 may be stored in the memory 202. In an embodiment, the control module 218 may be configured to implement an optimization algorithm to generate the data pertaining to the response time characteristics of the first engine group 103. Further, the control module 218 may use the optimization algorithm to determine a group or groups of the engines 102 to achieve a fastest response time or times as compared to all other possible groupings of the engines 102 to reach a predetermined power output value from a current output power of the multi-engine machine 100. In an embodiment, the optimization algorithm may also be referred to as Multi-Engine Optimization (MEO) algorithm. The control module 218 may store the data pertaining to the response time characteristics in the memory 202.

Further, the control module 218 may determine a second engine group 104, which may include one or more engines of the engines 102. At least one engine of the second engine group 104 is different from the engines of the first engine group 103. FIG. 2, for instance, illustrates the second engine group 104 being comprised or consisting of one engine. Further, the engine of the second engine group 104 may have performance characteristics different from at least one engine of the first engine group 103. Alternatively, the engine of the second engine group 104 may have the same performance characteristics as those of the first engine group 103, but with different initial operating characteristics. The control module 218 may determine the second engine group 104 based on the data regarding response time characteristics of the engines 102. Further, the second engine group 104 may be driven either before or subsequent to driving the engines of the first engine group 103 to achieve an overall fastest response time as compared to all other possible groupings of the engines 102 to reach a predetermined power output value from the current output power of the multi-engine machine 100.

In an embodiment, the data regarding the response time characteristics of the engines 102 may be stored in the memory 202 and may include a plurality of optimized distribution maps for different groups of some or all of the engines 102 corresponding to different predetermined output power requests. The different groups of the engines 102 may include the first engine group 103 and the second engine group 104, such as shown and described relative to FIGS. 1 and 2. In an embodiment, the plurality of optimized distribution maps may be generated in an online mode. In the online mode, generally speaking, the control system 110 may detect the load parameters in real-time. In such an embodiment, the data detected in real-time may be used to update a lookup table or optimized distribution map regarding power distribution (i.e., engine operating range) for different combinations of the engines 102 in correspondence with different requested power amounts.

In another embodiment, the plurality of optimized distribution maps may be generated in an offline mode. In such an embodiment, the plurality of optimized distribution maps so generated may be stored in the form of one or more look-up tables and may be referred to optimize overall engine output power response time or times of the multi-engine machine 100 in real time. In an embodiment, the stored data pertaining to the optimized distribution maps may pertain to historical performance of the engines 102 in various operating conditions, such as different load conditions. Such load conditions may include, for example, operation of each of the engines 102 (or each engine type) across 0-99% load conditions, across 0-120% load conditions, and/or across partial response load conditions starting at non-zero load values. Thus, engine response time data can be based on data corresponding to different, previously determined engine load conditions for each engine type across different load conditions (i.e., power distribution or engine operating range) and for different initial load conditions, particularly non-zero initial engine load conditions. For example, a look-up table may include previously determined data corresponding to a response time for one type of engine to reach 3,500 kW from an initial load condition of 1,500 kW (i.e., a non-zero initial engine load condition).

As noted above, in an embodiment, all engines of the first engine group 103 and the second engine group 104 may have same the same performance characteristics, which can include the same performance rating. Performance rating may include a same power rating (i.e., engine operating range for a particular engine). In another embodiment, the second engine group 104 may include at least one engine with a performance rating different from all engines of the first engine group 104. For example, in an embodiment, the first engine group 103 may be comprised of engines having the same performance rating, and the second engine group 104 may be a single engine having a performance rating different from the engines of the first engine group 103. As another example, the first engine group 103 may be comprised of a plurality of engines having the same performance rating and another engine having a performance rating different from the engines of the plurality, and the second engine group 104 may be comprised of only the another engine having the performance rating different from the engines of the plurality with the same performance rating.

In an embodiment, the control module 218 may group the first engine group 103 on the basis that such one or more engines have a relatively fast response time (as compared to the second engine group 104 or any other determined engine groups) up to a predetermined power output threshold. On the other hand, the control module 218 may group the second engine group 104 on the basis that such one or more engines have relatively higher power efficiency. Therefore, the first engine group 103 may be utilized during an initial phase of the multi-engine machine 100, for example, until the predetermined power output threshold is reached. Once the "initial" phase is completed, i.e., the predetermined power output threshold is reached, power output by the second engine group 104 may be ramped up, for instance.

In an embodiment, the control module 218 may determine a current amount of output power of the multi-engine machine 100 based on one or more values of the control parameters received by the data receiving module 212. Further, the control module 218 may compare the current amount of output power with a predetermined power output threshold. In an embodiment, the predetermined power output threshold can be indicative of a predefined step threshold in the output power of the multi-engine machine 100.

Based on the comparison, the control module 218 may control the first engine group 103, for instance, to increase the output power of the multi-engine machine 100 when the output power of the multi-engine machine 100 is below the predetermined power output threshold. In an embodiment, the control module 218 may increase the output power of the multi-engine machine 100 from a non-zero power output value toward and to the predetermined power output threshold when controlling the first engine group 103 to increase output power of the multi-engine machine 100.

Further, the control module 218 may control the second engine group 104 to increase the output power of the multi-engine machine 100 in response to the output power of the multi-engine machine 100 reaching the predetermined power output threshold. Thus, the control module 218 may control the second engine group 104 to continue increasing the output power of the multi-engine machine 100 until a desired or requested power output threshold of the multi-engine machine 100 is reached. Alternatively, the control module 218 may control a third engine group, for instance, to continue increasing the output power of the multi-engine machine 100 when the output power of the multi-engine machine 100 reaches a second predetermined power output threshold above the predetermined power output threshold associated with the second engine group 104. Of course, embodiments of the disclosed subject matter are not limited to two or three engine groups and corresponding predetermined power output thresholds.

Figure 3:
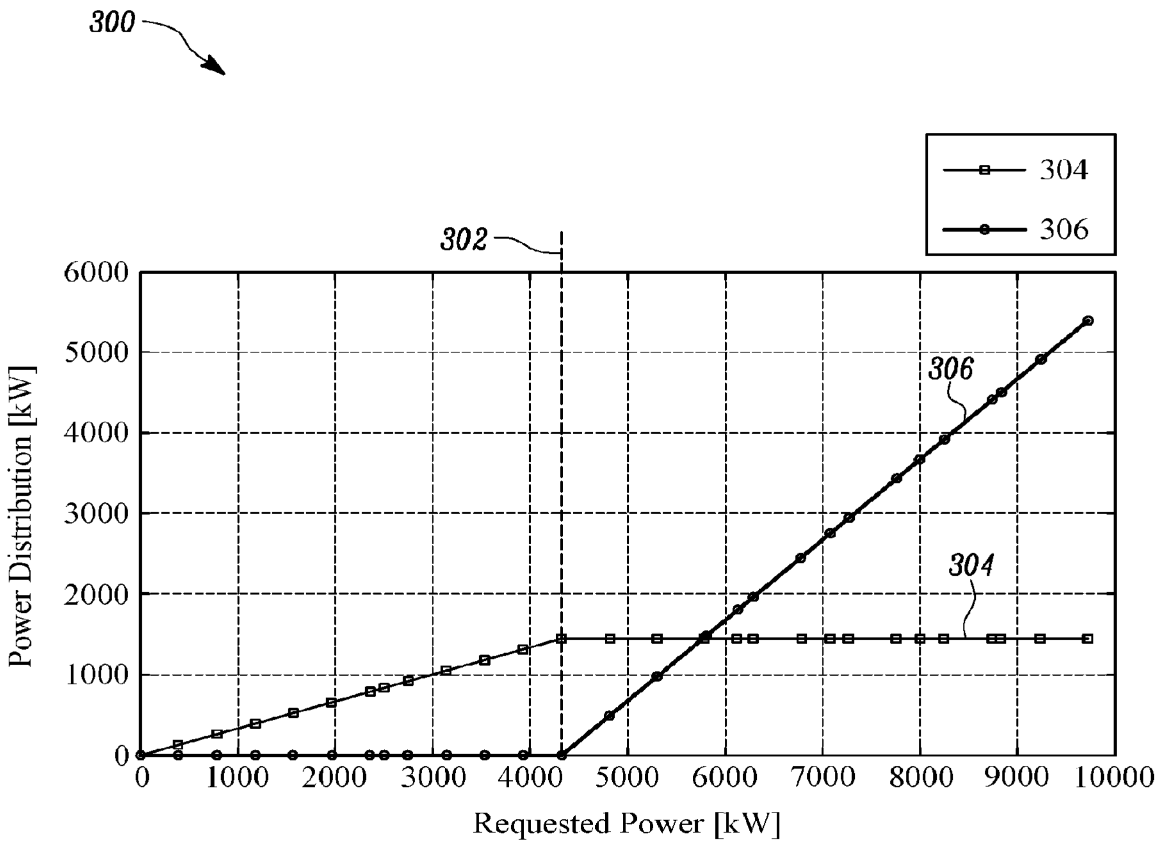
FIG. 3 is a graph of engine operating range power distribution versus requested output power for the machine corresponding to different engine groups to control power output by the different engine groups based on different amounts of requested output power, according to an embodiment of the present disclosure.

FIG. 3 is a graph 300 of engine operating range power distribution versus requested output power for the multi-engine machine 100 corresponding to different engine groups to control power output by the different engine groups based on different amounts of requested output power, according to an embodiment of the present disclosure. Optionally, data corresponding to the graph 300 may be implemented in a lookup table referenced in the performance mode discussed above.

As shown in the graph 300, "Power Distribution" (in kiloWatts) is denoted along the ordinate, i.e., Y axis, and "Requested Power" (in kiloWatts) is denoted along the abscissa, i.e., X axis. In the illustrated example, the data 304 is associated with a first engine type (i.e., a "Type 1" engine), and the data 306 is associated with a second engine type (i.e., a "Type 2" engine) different from the first engine type. In this particular example, the data 304 corresponds to three Type 1 engines, and the data 306 corresponds to one Type 2 engine. Depending upon the requested power and the current output power, the three Type 1 engines and the one Type 2 engine may be indicative of the first engine group 103 and the second engine group 104, as determined by the controller 204 of the control system 110.

In the illustrated example, the Type 1 engines may be engines with relatively faster response time, for instance, relative to a requested power amount from zero to 4,250 kW. Therefore, in an initial phase of operating the multi-engine machine 100, for example, until 4,250 kW, the controller 204 may determine that only the Type 1 engines constitute the first engine group 103 for supplying power to the multi-engine machine 100. Further, when the requested output power reaches or exceeds 4,250 kW, the controller 204 may also operate the Type 2 engine. That is, the controller 204 may determine that the Type 1 engines and the Type 2 engine constitute the second engine group 104 for supplying power to the multi-engine machine 100. Alternatively, when the requested output power reaches or exceeds 4,250 kW or 5,750 kW, the controller 204 may operate the Type 2 engine as the exclusive engine for the second engine group 104. In the illustrated example, 4,250 kW may be understood as a predetermined power output threshold 302 at which to switch from the first engine group 103 to the second engine group 104 to achieve an overall minimum (i.e., fastest) response time to reach a desired or requested amount of output power above 4,250 kW. Optionally, 5,750 kW may also be a predetermined power output threshold to switch engine groups, for instance, from the second engine group 104 to another engine group to reach a desired or requested amount of output power above 5,750 kW.

Referring back to FIG. 2, in an embodiment, when the multi-engine machine 100 is operated in the load sharing mode, the control module 218 may switch the operational mode of the multi-engine machine 100 from the load sharing mode to the performance mode, as noted above, responsive to detection of a power output transient or step condition regarding a requested power amount at which to drive the multi-engine machine 100 relative to a current output power at which the multi-engine machine 100 is driven, for instance. The control module 218 may switch from the load sharing mode to the performance mode to optimize the response time of the multi-engine machine 100 by determining one or more different groups of engines, for instance, the first engine group 103 and the second engine group 104. In other embodiments, the control module 218 may switch the operational mode of the multi-engine machine 100 from one of the fuel-efficient mode and the emission reduction mode to the performance mode responsive to the detection of the power output transient or step condition.

In an embodiment, the control module 218 may be in communication with a hysteresis control unit 222. The control module 218 may switch to the performance mode based on a hysteresis control, such as a rate limit or default time duration. In a case of the hysteresis control, the engines 102 may not unnecessarily switch between the operational modes, or different groups of engines, in response to either a relatively small change in output power of the selectively driven group of engines that brings the output power below predetermined power output thresholds or a relatively small change in requested output power for the multi-engine machine 100. Thus, the hysteresis control unit 222 may ensure a smooth transition between the operational modes.

In an embodiment, the control module 218 may switch the operational mode of the multi-engine machine 100 to the load sharing mode from the performance mode, once the desired load condition and/or a steady state condition is achieved by the multi-engine machine 100. The steady state condition of the multi-engine machine 100 may be defined with respect to factors, such as a rate limit and predefined time duration.

Figure 4:
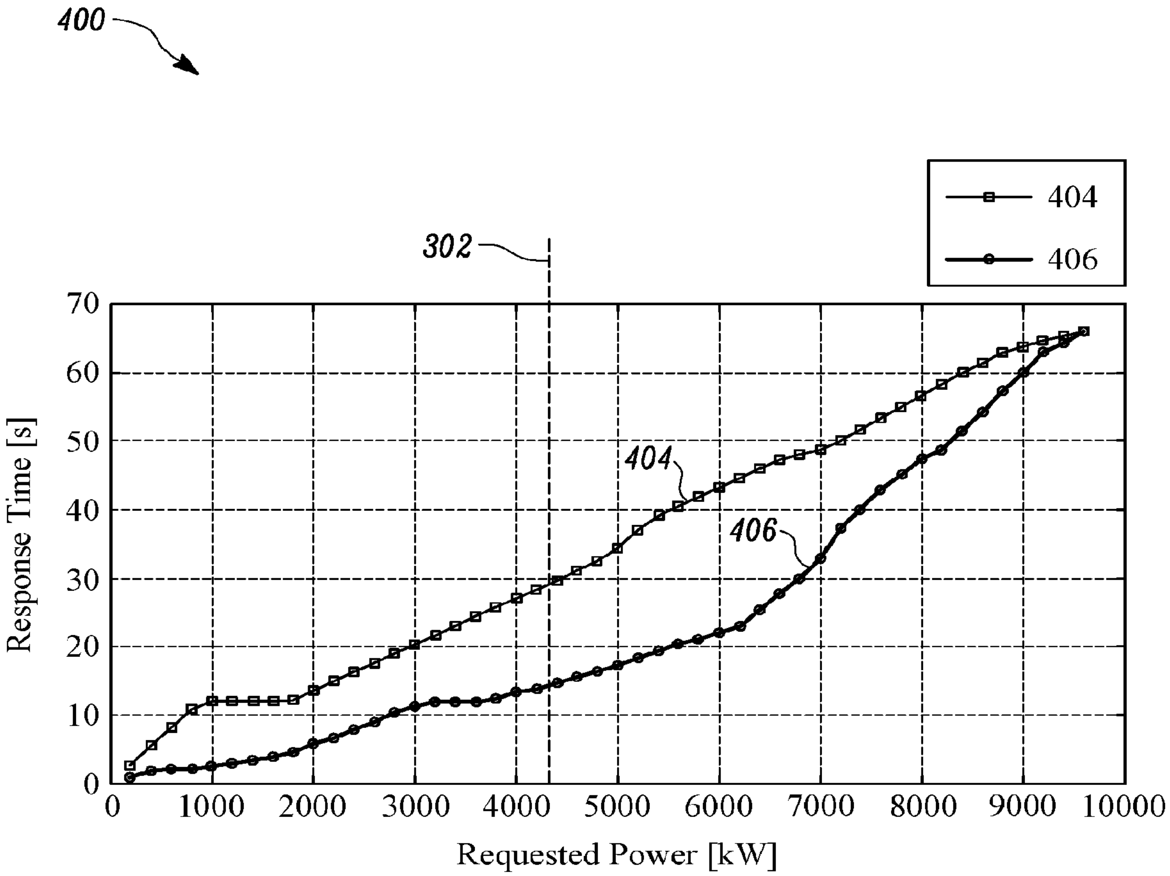
FIG. 4 is a graph of total engine response time versus requested output power for the machine comparing total response time of the different engine groups in a load share mode and a response time optimization mode, according to an embodiment of the present disclosure.

FIG. 4 is a graph 400 of total engine response time versus requested output power for the multi-engine machine 100 comparing total response time of the different engine groups of FIG. 3 in a load share mode and a performance mode (i.e., a response time optimization mode), according to an embodiment of the present disclosure. In the illustrated example, "Response Time" is denoted along the ordinate, i.e., Y axis of the graph and "Requested Power" (in kilo-Watts) is denoted along the abscissa, i.e., X axis of the graph. Further, data 404 corresponds to total response time of the engines 102 according to an engine grouping in a load sharing mode, such as a constant ratio load sharing mode, across the indicated different requested power amounts. Data 406 corresponds to total response time of the first engine group 103 and the second engine group 104 across the indicated different requested power amounts. As shown in the graph 400, the response time of the multi-engine machine 100 in the performance mode is predominately less in comparison to the response time of the multi-engine machine 100 in the load sharing load for different requested output power amounts. That is, with the exception of the highest requested power amount in the graph 400, the response time of the multi-engine machine 100 both before and after the predetermined power output threshold 302 where the performance mode switches from the first engine group 103 to the second engine group 104 is predominately less in comparison to the response time of the multi-engine machine 100 in the load sharing load for different requested output power amounts.

Figure 5:
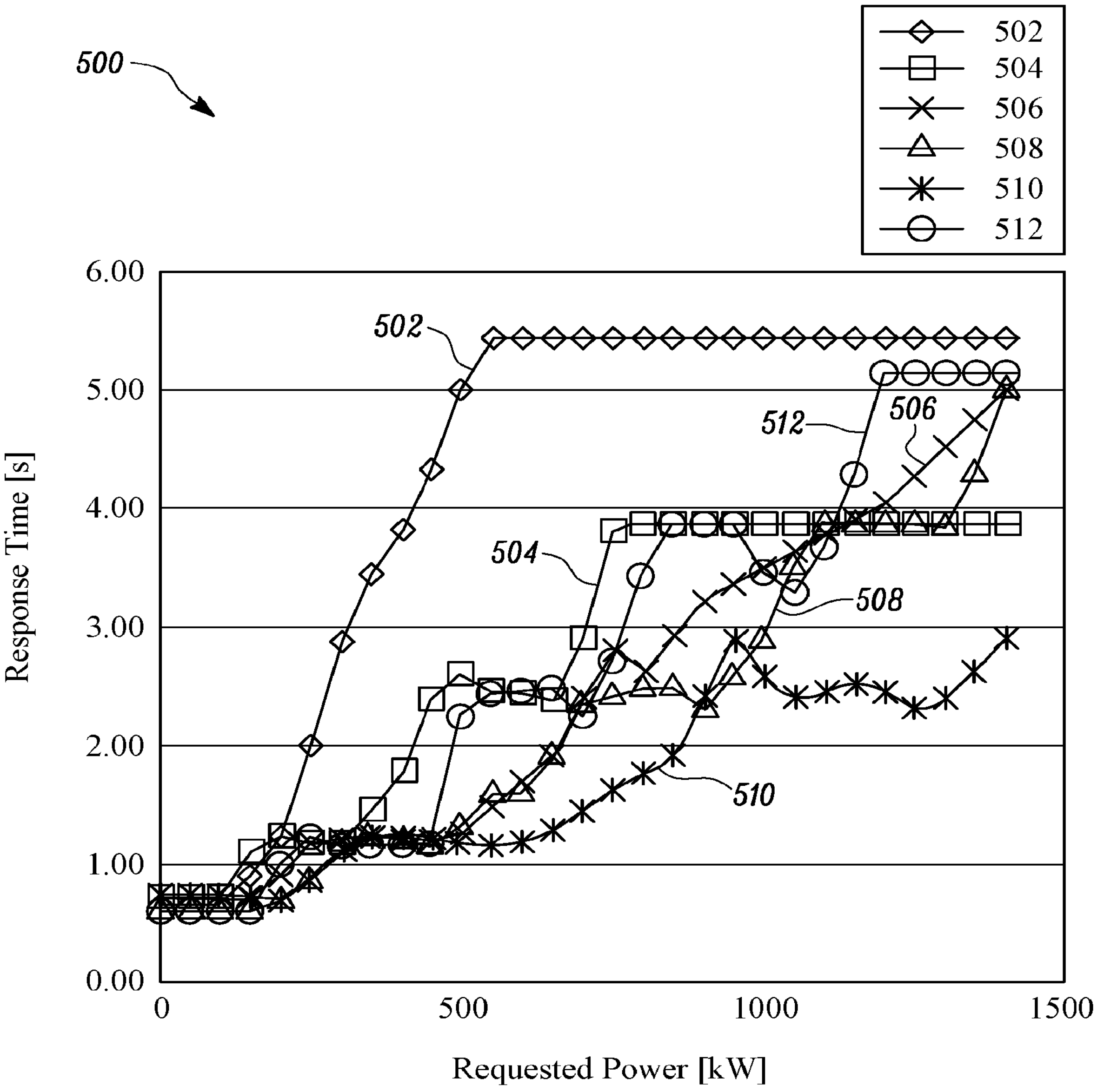
FIG. 5 is a graph of total engine response time versus requested output power for a machine comparing total response time of different engine groups in different modes of engine operation, according to an embodiment of the present disclosure.

FIG. 5 is a graph 500 of total engine response time versus requested output power for a multi-engine machine, such as multi-engine machine 100, comparing total response time of different engines or engine groups in different modes of operation, according to an embodiment of the present disclosure. In the illustrated example, the "Response Time" is denoted along the ordinate, i.e., Y axis and the "Requested Power" in "kiloWatts" is denoted along the abscissa, i.e., X axis.

Notably, the data 502 corresponds to the total response time for a "Type 3" engine operated as the sole engine (i.e., neither load sharing more nor performance mode) along a requested power range, and the data 504 corresponds to the total response time for a "Type 4" engine operated as the sole engine along the requested power range (i.e., neither load sharing more nor performance mode). The data 506 corresponds to the total response time associated with a load share mode in which load is shared between the Type 3 engine and the Type 4 engine along the requested power range. According to an embodiment of the present disclosure, the data 508 corresponds to the total response time in a performance mode when using one Type 3 engine and one Type 4 engine along the requested power range. Likewise, the data 510 corresponds to the total response time in a performance mode using two Type 4 engines along the requested power range. Finally, the data 512 corresponds to the total response time in an economy mode of the multi-engine machine 100 along the requested power range. Thus, depending upon the requested output power and the current output power of the multi-engine machine 100, one or more of the groups may be selectively driven in the performance mode to reach the requested output power amount according to a fastest possible overall response time.

For example, two Type 4 engines may be selected as the first engine group 103 to drive the multi-engine machine 100 from an initial load condition of 500 kW up to approximately 750 kW as a predetermined power output threshold, since such engine group has the fastest response time as compared to the other engines or engine groupings. Then, one Type 3 engine and one Type 4 engine may be selected as the second engine group 104 to drive the multi-engine machine 100 from approximately 750 kW to approximately 900 kW, since such engine group has the fastest response time as compared to the other engines or engine groupings. Upon reaching 900 kW, control may be switched back to the first engine group 103 (comprised of two Type 4 engines), since the first engine group 103 has the fastest response time from approximately 900 kW and above as compared to the other engines or engine groupings.

Referring back to FIG. 2, in an embodiment, the control system 110 may implement the optimization algorithm to optimize the response time of the multi-engine machine 100. In an embodiment, the control system 110 may implement a particle swarm optimization algorithm to optimize the response time. Therefore, the control module 218 may determine the first engine group 103 and the second engine group 104 using the particle swarm optimization algorithm. Generally speaking, the determination of the engine groups, such as the first engine group 103 and the second engine group 104 in the performance mode can mean that such groups provide the fastest total engine output respond time for different requested power amount ranges. The control module 218 may further control the first engine group 103 to increase the output power of the multi-engine machine 100 on the basis of the particle swarm optimization algorithm, when the output power of the multi-engine machine 100 is below a predetermined power output threshold. Similarly, the control module 218 may control the second engine group 104 to increase the output power of the multi-engine machine 100 in response to the output power of the multi-engine machine 100 reaching the predetermined power output threshold on the basis of the particle swarm optimization algorithm. Therefore, the optimization algorithm may generate distributed power requests to each engine of the first engine group 103 and the second engine group 104 to optimize the response time for different step load conditions.

In an embodiment where some or all of the engines 102 are different in terms of performance and operational characteristics, the total response time of the multi-engine machine 100 may be an objective function. Further, the control module 218 may assign priorities to different groups of the engines 102 based on the control parameters and other relevant factors. Based on the priorities assigned by the control module 218, power may be transmitted to the group of engines with highest priority, for instance. Further, in an embodiment, engines with relatively low power output having relatively fast output power response times may be selected to supply power at a relatively low requested output power amount, and optimized engine combinations may be selected for operating the multi-engine machine 100 at a relatively high requested output power amount, for instance, either based on engine efficiency or total response time at the relatively high requested output power amount.

In an embodiment, the control system 110 may be in communication with an online-offline status panel 220. In particular, the controller 204 of the control system 110 may be coupled to the online-offline status panel 220. The control system 110 may set status as "online mode" or "offline mode" by sending an instruction to the online-offline status panel 220. Therefore, the online-offline status panel 220 may set the status "online mode" or "offline mode." As mentioned previously, in the online mode, the control system 110 may detect the control parameters and operate in real-time, whereas in the offline mode, the control system 110 may use optimum distribution maps and/or the look-up tables stored in the memory 202 for operating the multi-engine machine 100 in the performance mode.

In an embodiment, the control system 110 is configured to detect a transient stepped power load condition resulting from a requested amount of engine power output for the multi-engine machine 100 to a current power load of the multi-engine machine 100. Further, the control system 110 may be configured to switch engine control to the performance mode upon detection of the transient stepped power load condition. Once the multi-engine machine 100 is operating in the performance mode, the control system 110 may determine which of the engines 102 are available to control in the performance mode and determine one or more groups of the available engines to drive to achieve a total minimum response time to reach a desired or requested output power value for the multi-engine machine 100 from a current power output value of the multi-engine machine 100.

Further, the control system 110 may be configured to detect current power load conditions of each engine of the engines 102 determined to be available in the performance mode. Upon detection of the current power load conditions, the control system 110 may determine an engine power control strategy to control determined groups of the engines 102. The engine power control strategy may control available engines of the first engine group 103 and available engines of the second engine group 104 to achieve a minimum total engine response time to reach the requested amount of engine power output for the multi-engine machine 100 from the current power load of the multi-engine machine 100. In an embodiment, the control system 110 may control the first engine group and the second engine group based on the number of available engines per type, the detected current power load conditions of the available engines, and the performance ratings of the different types of available engines.

The control system 110 may be further configured to output a distributed power request to selectively drive the available engines according to a plurality of different engine groupings, such as the first engine group 103 and the second engine group 104, to control a total engine response time according to the minimum total response time to reach the requested amount of engine power output for the multi-engine machine 100 from the current power load of the multi-engine machine 100. The control system 110 may be configured to selectively drive the first engine group 103 and the second engine group 104 to control the total response time according to the minimum total response time to reach the requested amount of engine power output for the multi-engine machine 100 from the current power load of the multi-engine machine 100. The selective driving may include switching from one of the first engine group 103 and the second engine group 104 to the other of the first engine group 103 and the second engine group 104 responsive to a power load condition of the one engine group reaching a predetermined power load condition threshold.

INDUSTRIAL APPLICABILITY

The present disclosure relates to the multi-engine machine 100, the control system 110, and a computer-implemented method 600, hereinafter referred to as method 600, for controlling operations of the engines 102 to optimize engine power output response time or times of the multi-engine machine 100. The multi-engine machine 100, the control system 110, and the method 600 may select one or more combinations of engines (i.e., engine groups) from the engines 102 to operate so as to optimize a total engine power output response time of the multi-engine machine 100 to reach a requested or desired power output amount for the multi-engine machine 100.

Although the present disclosure is explained with regard to the multi-engine marine vessel 100, the scope of the present disclosure is not limited to the multi-engine marine vessel 100 explained in the disclosure. The present disclosure may include optimizing engine power output response time or times for different engine groups of the engines 102 operating in any machine known in the art, without departing from the scope of the disclosure.

Figure 6:
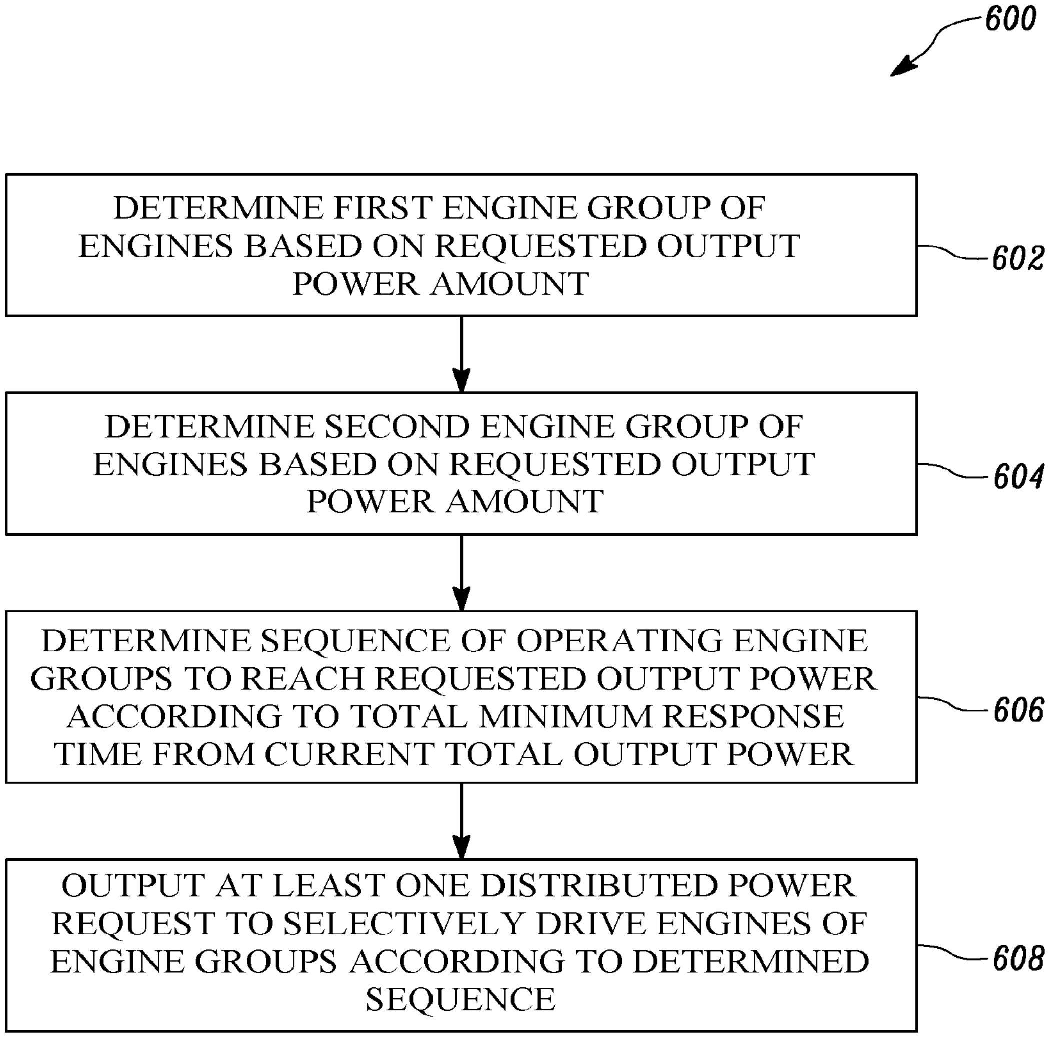
FIG. 6 is a flowchart of a method for controlling power output by different engine groups of the machine, according to an embodiment of the present disclosure.

FIG. 6 illustrates a flowchart of a method 600 for controlling power output by different engine groups of the engines 102 of the multi-engine machine 100, such as first engine group 103 and second engine group 104, according to an embodiment of the present disclosure. For the sake of brevity, the aspects of the present disclosure which are already explained in detail in the description of FIG. 1, FIG. 2, FIG. 3, FIG. 4, and FIG. 5 are not explained in detail with regard to the description of the method 600.

At block 602, in a performance mode, the method 600 can determine a first engine group 103 of the engines 102. The first engine group 103 may be determined based on a requested output power amount for the multi-engine machine 100, engine performance characteristics of each of the engines 102 of the multi-engine machine 100, and a current engine load of each of the engines 102 of the multi-engine machine 100. In an embodiment, the requested output power amount for the multi-engine machine 100 may correspond to a transient change in step power load conditions to a first step power load condition greater than a second step power load condition associated with the current total output power amount of the engines 102. In an embodiment, the current total output power amount of the engines 102 may be a non-zero value. That is, at least some of the engines may be outputting a non-zero power value. In an embodiment, the controller 204 of the control system 110 may determine the first engine group 103 of the engines 102.

At block 604, in the performance mode, the method 600 can determine a second engine group 104, different from the first engine group 103. The second engine group 103 may be determined based on the requested output power amount for the multi-engine machine 100, the engine performance characteristic of each of the engines 102 of the multi-engine machine 100, and the current engine load of each of the engines 102 of the multi-engine machine 100. In an embodiment, the method 600 may further include detecting whether the requested output power amount for the multi-engine machine 100 is a step change in the requested output power amount for the multi-engine machine 100. In such an embodiment, the first engine group 103 and the second engine group 104 may be determined in response to detection of the step change in the requested output power amount for the multi-engine machine 100. In an embodiment, the controller 204 of the control system 110 may determine the second engine group 104 of the engines 102.

At block 606, in the performance mode, the method 600 can determine a sequence of operating the first engine group 103 and the second engine group 104 to reach the requested output power amount for the multi-engine machine 100 according to a determined total minimum response time from a current total output power amount of the engines 102. The sequence of operating the first engine group 103 and the second group 104 can include switching operation from the first engine group 103 to the second engine group 104 when a predetermined power output threshold is reached. In an embodiment, the sequence of operating the first engine group 103 and the second engine group 104 may be determined based on a plurality of the optimized distribution maps of all possible engine groupings, and associated different stepped requested output power amounts. In an embodiment, the controller 204 of the control system 110 may determine the sequence of operating the first engine group 103 and the second engine group 104.

At block 608, in the performance mode, the method 600 can output at least one distributed power request to selectively drive engines of the first engine group 103 and the second engine group 104 according to the determined sequence of operating the first engine group 103 and the second engine group 104. A response time of the first engine group 103 may be faster than a response time of the second engine group 104. In an embodiment, the controller 204 of the control system 110 may output the at least one distributed power request to selectively drive the engines of the first engine group 103 and the second engine group 104.

In an embodiment, the first engine group 103 may consist of a first number of engines, and the second engine group 104 may consist of a second number of engines. The second number of engines may be different from the first number of engines. In an embodiment, all engines of the first engine group 103 and the second engine group 104 may have a same engine performance model. In another embodiment, at least one engine of the first engine group 103 may have a performance model different from at least one engine of the second engine group 104. In an embodiment, the multi-engine machine 100 may be one of a multi-engine marine vessel and a land drilling power generating machine.

The multi-engine machine 100, the control system 110, and the method 600 can offer an effective technique to optimize engine power output response time or times of the multi-engine machine 100. The present disclosure offers optimizing the response time of the multi-engine machine 100 for a range or ranges of requested output power values by selecting different combinations of the engines 102 for a particular range or ranges of requested output power values. The categorization and thus grouping of the engines 102 may be performed according to various factors, such as power output capacity and other operational and performance characteristics.

Further, the control system 110 may use a hysteresis technique to eliminate or reduce unwanted switching between different groups of the engines 102 and modes of operation. Further, the control system 110 can operate in an online mode as well as in an offline mode. Therefore, engine power output response time analysis can be done based on data stored in the memory 202 and/or based on data fed back in real-time.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system to optimize response time of a plurality of engines of a machine, the control system comprising:

memory configured to store data regarding response time characteristics of the plurality of engines; and a controller in communication with the memory, the controller configured to:

determine a first group of engines of the plurality of engines based on the data regarding response time characteristics of the plurality of engines, determine a second group of engines of the plurality of engines, different from the first group of engines, based on the data regarding response time characteristics of the plurality of engines, control the first group of engines to increase output power of the machine when the output power of the machine is below a predetermined power output threshold, and control the second group of engines to increase output power of the machine responsive to the output power of the machine reaching the predetermined power output threshold, wherein a response time of the first group of engines is faster than a response time of the second group of engines when the output power of the machine is below the predetermined power output threshold.

2. The control system of claim 1, wherein the data regarding response time characteristics of the plurality of engines stored in the memory includes a plurality of optimized distribution maps for different groups of engines, including the first group of engines and the second group of engines, corresponding to different predetermined output power requests.

3. The control system of claim 1, wherein the controller is configured to:

perform an optimization algorithm to generate the data regarding response time characteristics of the plurality of engines, and store the data regarding response time characteristics of the plurality of engines in the memory.

4. The control system of claim 1, wherein the controller implements a particle swarm optimization algorithm to determine the first group of engines and the second group of engines, to control the first group of engines to increase output power of the machine when the output power of the machine is below the predetermined power output threshold, and to control the second group of engines to increase output power of the machine responsive to the output power of the machine reaching the predetermined power output threshold.

5. The control system of claim 1, wherein the predetermined power output threshold represents a predefined step threshold in output power of the machine.

6. The control system of claim 1, wherein the controller is configured to:

detect a transient step change in requested output power for the machine, and switch from a constant-ratio load sharing mode to a performance mode to optimize the response time of the machine responsive to detection of the transient step change in the requested output power for the machine by determining the first group of engines and the second group of engines and controlling the first group of engines and the second group of engines to increase output power of the machine.

7. The control system of claim 1, wherein the controller increases output power of the machine from an idle state of the machine when controlling the first group of engines to increase output power of the machine.

8. The control system of claim 1, wherein the controller increases output power of the machine from a non-zero power output value when controlling the first group of engines to increase output power of the machine.

9. The control system of claim 1, wherein the second group of engines includes at least one engine with a first power rating different from a second power rating of all engines of the first group of engines.

10. The control system of claim 1, wherein all engines of the first and second groups of engines have a same power rating.

* * * * *